United States Patent
Heyes

(10) Patent No.: US 6,594,995 B2
(45) Date of Patent: Jul. 22, 2003

(54) TURBOCHARGING OF ENGINES

(75) Inventor: Francis Joseph Geoffrey Heyes, Lincoln (GB)

(73) Assignee: Alstom Power UK Ltd., Lincoln (GB)

( * ) Notice: Subject to any disclaimer, the term of this patent is extended or adjusted under 35 U.S.C. 154(b) by 0 days.

(21) Appl. No.: 09/957,225

(22) Filed: Sep. 20, 2001

(65) Prior Publication Data

US 2002/0069845 A1 Jun. 13, 2002

(30) Foreign Application Priority Data

Sep. 23, 2000 (GB) .............................................. 0023395

(51) Int. Cl.[7] .............................................. F02D 23/00
(52) U.S. Cl. ........................... 60/602; 60/601; 415/115
(58) Field of Search .................... 60/602, 600, 601; 415/115

(56) References Cited

U.S. PATENT DOCUMENTS

| 2,825,532 A | * | 3/1958 | Kadosch et al. | ............ | 415/115 |
| 4,630,445 A | * | 12/1986 | Parker | ......................... | 60/602 |
| 4,658,587 A | * | 4/1987 | Ecomard | ..................... | 60/602 |
| 6,151,549 A | * | 11/2000 | Andrews et al. | .............. | 60/601 |
| 6,295,814 B1 | * | 10/2001 | Schmidt et al. | .............. | 60/602 |
| 6,318,960 B1 | * | 11/2001 | Kuwabara et al. | ......... | 415/115 |

FOREIGN PATENT DOCUMENTS

| GB | 2 106 191 A | 9/1981 |
| GB | 2 210 668 A | 6/1989 |
| GB | 2 301 405 A | 12/1996 |
| GB | 2 312 930 A | 11/1997 |
| JP | 36 2045903 A | * 2/1987 | ................. 415/115 |
| JP | 40 5209530 A | * 8/1993 | ................. 60/602 |

* cited by examiner

Primary Examiner—Thomas Denion
Assistant Examiner—Thai-Ba Trieu
(74) Attorney, Agent, or Firm—Kirschstein, et al.

(57) ABSTRACT

A turbocharged internal combustion engine is provided with a diverter valve arranged to divert part of the exhaust gas flow along a conduit for introduction into a turbine region. Exhaust gases flow from the conduit, through appropriate galleries in the turbocharger casing, into internal passages formed in at least some of the stator blades. From the internal passages, the exhaust gas passes through holes positioned near the downstream ends of the convex surfaces of the stator blades. In this manner, the diverted gas is introduced into the comparatively lower pressure of the turbine region thereby enabling the diverted exhaust gas to rejoin the mainstream exhaust gas and to do useful work in driving the rotor blades while, at the same time, avoiding choking the stator blades.

11 Claims, 2 Drawing Sheets

TURBOCHARGING OF ENGINES

FIELD OF THE INVENTION

This invention relates to turbocharged internal combustion engines, turbochargers for such engines, and to a method of preventing the turbine of a turbocharger from choking at high speed. More particularly, it relates to novel improvements to the so-called "wastegate system" which, under certain operational conditions, directs some of the engine exhaust gas away from the turbocharger turbine inlet.

BACKGROUND OF THE INVENTION

A turbocharger typically has a turbine driven by engine exhaust gas and a compressor for supplying compressed atmospheric air for engine combustion, both turbine and compressor being fixed to a common rotating shaft. For componentry of fixed dimensions, it is not possible to have a turbine, compressor and engine combination that is perfectly suited for all engine duties, load and speed ranges. Usually turbocharger components are matched to suit particular engine duty in order to give best engine/turbocharger overall efficiency at a chosen speed and load condition. Outside this envelope, the efficiency will be less.

Where a small turbocharger turbine is chosen to match low engine speed and high torque requirements, this has the consequence that, at high engine speed, the pressure of the air will be too high (for a given compressor size) and is likely to cause difficulties for the engine.

Conversely, when a larger turbine is chosen to match high engine speed requirements, the turbine may not develop sufficient power at low engine speed to produce sufficient compressed air to meet engine requirements at low speed and high torque.

In the case where a small turbocharger turbine is chosen, the "wastegate system" is commonly adopted to reduce the production of excess compressed air at higher speeds. This is achieved by diverting some of the exhaust gas, at higher engine speeds, from the turbine inlet and reintroducing the diverted exhaust gas at a point downstream of the turbine. While this prevents turbine choking, it is clearly wasteful of some of the exhaust gas energy.

On the other hand, where a larger turbine is chosen, the problem of insufficient compressed air at low engine speed can be addressed by mechanisms which reduce the effective turbine nozzle capacity, thereby simulating the characteristic of a smaller turbine. U.K. Patent No. GB-A-2106191 is an example of the use of air pressure to achieve this effect, compressed air being dumped through a regulator valve into air distribution pipes supplying slots or orifices which are formed through the outer stator ring and open in a radial or substantially radial direction into the exhaust gas flow between the stator blades or vanes.

Other mechanical systems are known for varying the turbine nozzle capacity by repositioning nozzle blade angles on demand, thereby suiting engine speed and load requirements. Unfortunately, such systems suffer from both a cost penalty and from the unreliability associated with increased mechanical complexity.

SUMMARY OF THE INVENTION

According to one aspect of the invention, a turbocharged internal combustion engine has a turbocharger which comprises an axial flow turbine arranged to be driven by a flow of exhaust gas generated by the engine and an air compressor arranged to be driven by the turbine for supplying combustion air to the engine. The turbine has stator blades defining nozzles positioned upstream of rotor blades, and has a diverter valve operable to divert part of the exhaust gas flow into a turbine region defined between the nozzle throats and the leading edges of the rotor blades.

In this manner, the diverted exhaust gas is passed into a low pressure region of the turbine where it can do useful work in driving the rotor blades while at the same time avoiding choking the stator blades, thereby improving efficiency of the engine/turbocharger system.

According to another aspect of the invention, a turbocharger comprises an axial flow turbine and an air compressor, the turbine having stator blades defining nozzles positioned upstream of rotor blades, a casing defining primary and secondary inlets for exhaust gas, the primary inlet being arranged to admit exhaust gas into the turbine upstream with the stator blades, and the secondary inlet being positioned to conduct exhaust gas into a turbine region defined between the nozzle throats and leading edges of the rotor blades.

The invention has further features which relate to both a turbocharged internal combustion engine and to a turbocharger. Preferably, at least some of the stator blades define an internal passage for receiving diverted exhaust gas, and each passage is positioned to direct the diverted exhaust gas into the turbine region. In this case each passage is preferably positioned to discharge through a convex side of its stator blade. In this manner the diverted part of the exhaust gas flow is discharged from the low pressure sides of the stator blades. At least one hole is preferably formed through the convex side of each stator blade into its internal passage, and the holes are positioned to direct the diverted gas into the turbine region.

According to a further aspect of the invention, a method of preventing the turbine of a turbocharger from choking at high speed, comprises diverting some of the exhaust gas, produced by an associated internal combustion engine, into a low pressure region of the turbine.

The method preferably includes increasing the proportion of exhaust gases that are diverted as a function of turbine speed. In the case where the low pressure region is defined between stator blade nozzle throats and downstream leading edges of rotor blades, the method preferably includes introducing the diverted exhaust gas through convex surfaces of the stator blades.

BRIEF DESCRIPTION OF THE DRAWINGS

The invention is now illustrated, by way of example only, with reference to the drawings in which.

DETAILED DESCRIPTION OF THE PREFERRED EMBODIMENTS

Figure 1:
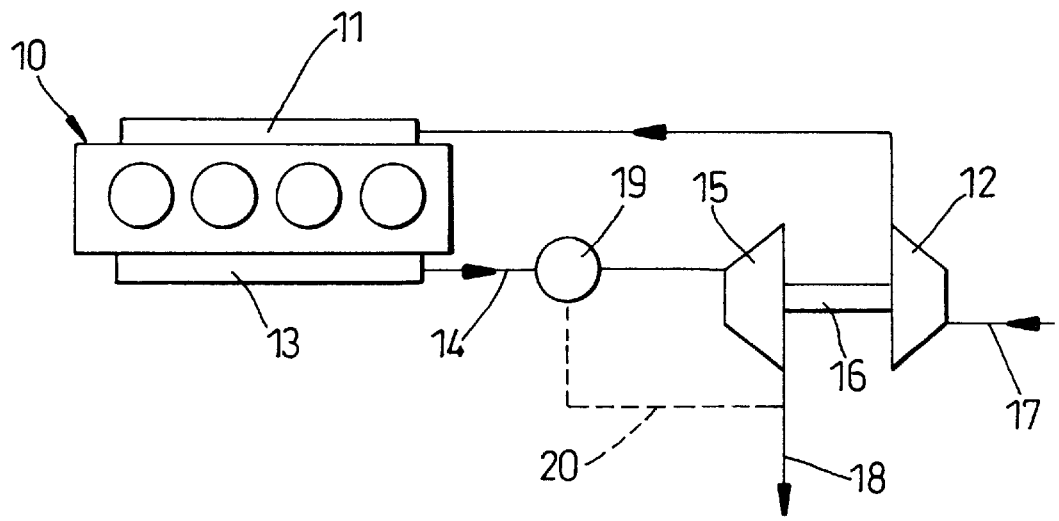
FIG. 1 is a diagram illustrating an internal combustion engine provided with a turbocharger having a typical "wastegate system" in accordance with the prior art.

With reference to FIG. 1, a turbocharged internal combustion engine 10 is provided with an air inlet manifold 11 to receive compressed air from an air compressor 12 forming part of the turbocharger, and with an exhaust gas manifold 13 arranged to deliver a flow 14 of exhaust gas to an axial flow turbine 15. As is well known in the art, the turbine 15 recovers energy from the flow 14 of exhaust gases to drive the air compressor 12 by a shaft 16. The air compressor 12, turbine 15 and shaft 16 would be supported within appropriate casings defining the main body of the turbocharger together with an air inlet 17 and a gas outlet 18. The turbocharger 12, 15 is arranged to operate on the "wastegate system" by the provision of a diverter valve 19 between the exhaust gas manifold 13 and the turbine 15. The diverter valve 19 is operable to divert some of the flow 14 of exhaust gases along a conduit 20 into the gas outlet 18 from the turbine 15. A noise silencer system is usually incorporated in the conduit 20. The diverter valve 19 is operable between a condition in which all of the flow 14 of exhaust gases is directed into the turbine 15, and other conditions in which different proportions of the flow 14 of exhaust gases are diverted along the conduit 20 to be exhausted to atmosphere via the gas outlet 18.

Figure 2:
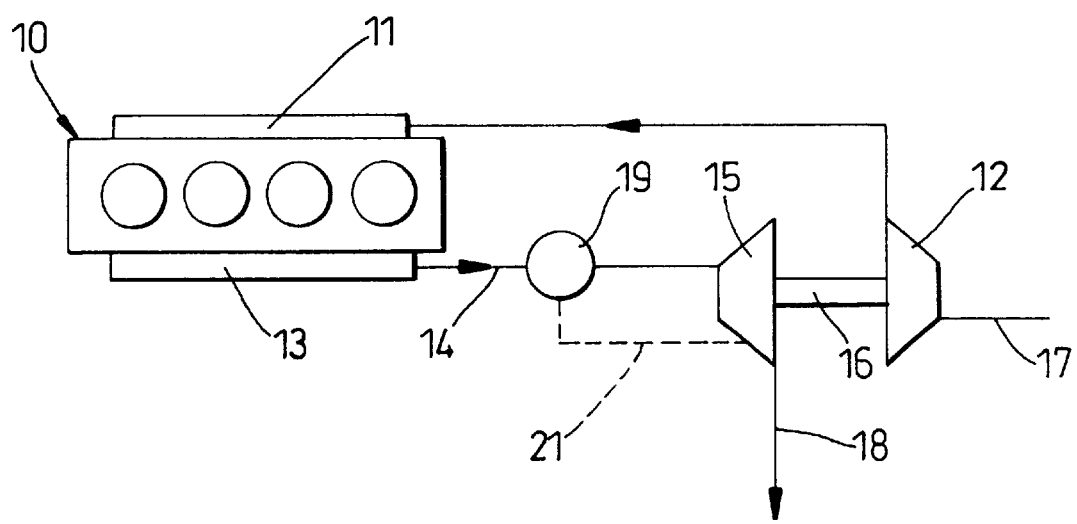
FIG. 2 is a diagram illustrating how the system shown in FIG. 1 is modified in accordance with the present invention.

The reference numerals used in FIG. 1 are also used in FIG. 2 to denote equivalent features. In FIG. 2 it will be noted that the conduit 20 of FIG. 1 has been replaced by a conduit 21 which conveys diverted gas from the diverter valve 19 into a secondary inlet to the turbine 15 intermediate the primary gas inlet and the gas outlet 18. In this manner the diverted gas is discharged into a region of the turbine 15 located between the turbine stator vane nozzle throat region and the leading edges of the turbine rotor blades as will be described in detail later with reference to FIG. 4.

Figure 3:
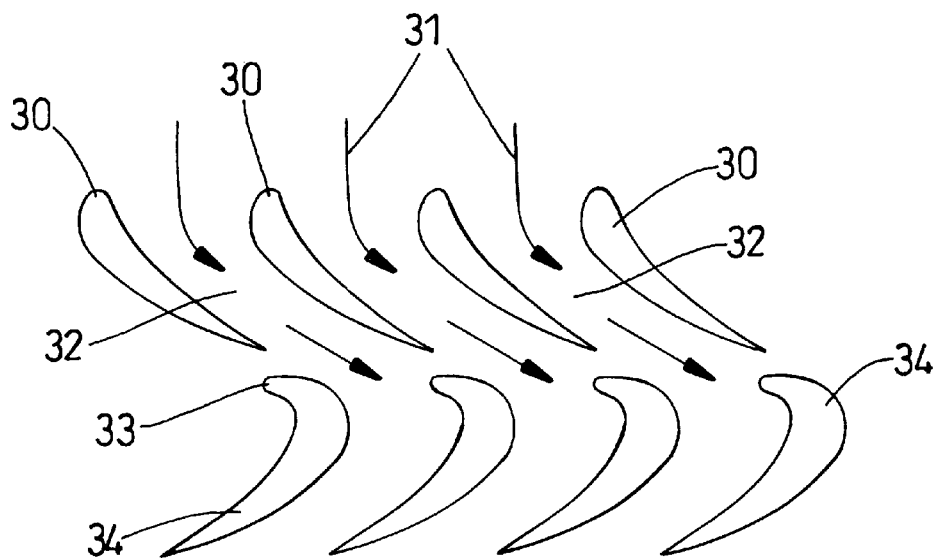
FIG. 3 illustrates the interaction of stator and rotor blades in an axial flow turbine section of a typical known turbocharger, the blades being viewed from tip to root and arrows being used to indicate the exhaust gas path.

From FIG. 3 it will be noted that, in a typical axial flow turbine section of a turbocharger, all of the exhaust gases produced by the engine will flow between aerofoil stator blades 30 as indicated by arrows 31. As illustrated, the stator blades 30 define nozzles 32 which accelerate the exhaust gases and change their flow direction to impinge on the leading edges 33 of aerofoil rotor blades 34. In this manner the rotor blades 34 abstract sufficient energy from the flow of exhaust gases to drive the air compressor 12.

Figure 4:
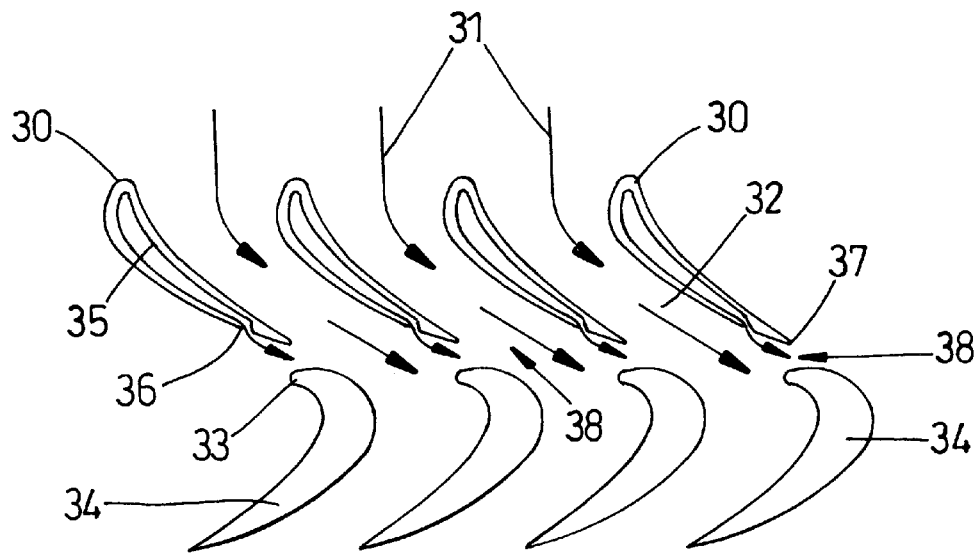
FIG. 4 is a diagram illustrating the modification of the stator blades shown in FIG. 3 in accordance with the present invention.

The reference numerals used in FIG. 3 are also used in FIG. 4 to denote equivalent features and only the points of difference will be described. It will be noted that the stator blades 30 are each provided with an internal passage 35 for conveying diverted gas from the diverter valve 19 to holes 36 which are formed through the convex side of each stator blade into its internal passage 35, the holes being positioned close to the trailing edges 37 of the stator blades. The internal passages 35 in the stator blades 30 communicate with the conduit 21 of FIG. 2 through appropriate galleries formed in the unshown casing of the turbocharger. In this connection the feeding of gas through galleries into turbine blades is well known in the art.

In this manner the diverted gas flow enters a turbine region 38 defined between the nozzles 32 and the leading edges 33 of the rotor blades 34. It will particularly be noted that the flow of exhaust gases over the convex side of the stator blades 30 will essentially have a lower pressure than the flow of exhaust gases over their concave sides. Also that the action of the nozzles 32 in accelerating the exhaust gases towards the leading edges 33 of the rotor blades 34 also essentially creates a drop in the pressure of the gas flow. For this reason the turbine region 38 has lower pressure than the flow of exhaust gases entering the stator blades 30. As a consequence, the diverted gas is introduced into the lower pressure of the turbine region 38 thereby preventing any choking of the nozzles 32 and enabling the diverted gas to do useful work in driving the rotor blades 34 while at the same time avoiding choking the stator blades 30.

It is envisaged that the diverted gas may be reintroduced to the mainstream flow within the turbine region 38 in other ways.

It will be noted that the invention teaches a method of preventing the turbine of a turbocharger from choking at high speed, the method comprising diverting some of the exhaust gas produced by the associated internal combustion engine into a low pressure region of the turbine. The diverter valve 19 is driven by an unshown actuator dependent upon turbine speed so that the proportion of exhaust gases that are diverted are a function of engine speed.

In an example of the invention, a turbocharger turbine is sized to provide the best match with the engine high torque at low speed requirements. When conditions for best efficiency require all the exhaust gas to be directed to the main inlet of the turbine, the diverter valve 19 will be set to close the conduit 21. Turbine maximum flow capacity is largely dependent on the nozzle cross-sectional area which is least in the throat regions of the nozzles 32. Downstream of the nozzle throat, the flow area of the nozzles 32 increases thereby providing capacity to accept an injection of a limited amount of exhaust gas from the conduit 21. As the speed and load of the engine 10 increases, the diversion valve 19 operates progressively to direct an increasing amount of the exhaust gas to this downstream region, that is the turbine region 38. This is achieved in a manner that does not create a fluid barrier which might otherwise restrict the mainstream flow of exhaust gas through the stator nozzles 32. In this manner the turbine is prevented from choking while, at the same time, some of the diverted gas energy is recovered by passing through the rotor blades 34 to extract useful work for driving the compressor 12.

The diverter valve 19 may be controlled to operate in relation to at least the air intake manifold pressure of the engine 10. As the manifold pressure increases beyond a predetermined value, the diversion valve will be operated to divert an amount of exhaust gas along the conduit 21, the amount of diverted gas varying with engine requirements and combined engine/turbocharger efficiency aims.

I claim:

1. A turbocharged internal combustion engine, comprising: a turbocharger including an axial flow turbine driven by a flow of exhaust gases generated by the engine, and an air compressor driven by the turbine for supplying combustion air to the engine, the turbine having stator blades defining nozzle throats positioned upstream of rotor blades; and a diverter valve operable for diverting a part of the flow of exhaust gases away from an inlet of the turbine to a location in the turbine downstream of the inlet, the diverter valve and the turbine being connected to divert the part of the flow of exhaust gases into a turbine region located downstream of the throats of the nozzles and upstream of the rotor blades.

2. The turbocharged internal combustion engine according to claim 1, in which at least some of the stator blades have internal passages for receiving the diverted part of the flow of exhaust gases, each passage being positioned to direct the diverted part into the turbine region.

3. A turbocharger, comprising: an axial flow turbine and an air compressor, the turbine including rotor blades, stator blades positioned upstream of the rotor blades, the stator blades defining nozzles having nozzle throats; primary inlet means for admitting exhaust gas into the turbine upstream of the stator blades; and wastegate inlet means positioned for conducting the exhaust gas into a turbine region located downstream of the nozzle throats and upstream of the rotor blades.

4. The turbocharger according to claim 3, in which at least some of the stator blades have internal passages for receiving wastegate exhaust gas, each passage being positioned to direct the wastegate exhaust gas into the turbine region.

5. A method of preventing a turbine of a turbocharger from choking at high speed, comprising the step of: diverting a proportion of exhaust gas produced by an associated internal combustion engine into a region of the turbine which is downstream of turbine nozzle throats in a first stage of turbine stator blades and upstream of an immediately succeeding stage of rotor blades.

6. A turbocharged internal combustion engine, comprising: a turbocharger including an axial flow turbine driven by a flow of exhaust gases generated by the engine, and an air compressor driven by the turbine for supplying combustion air to the engine, the turbine having stator blades defining nozzles positioned upstream of rotor blades; and a diverter valve operable for diverting a part of the flow of exhaust gases away from an inlet of the turbine to a turbine region defined between throats of the nozzles and the rotor blades; at least some of the stator blades having internal passages for receiving the diverted part of the flow of exhaust gases, the passages being arranged to discharge the diverted part through convex sides of the stator blades and direct the diverted part into the turbine region.

7. The turbocharged internal combustion engine according to claim 6, in which at least one hole is formed through the convex side of each stator blade into its internal passage, and said at least one hole is positioned to direct the diverted part into the turbine region.

8. A turbocharger, comprising: an axial flow turbine and an air compressor, the turbine including rotor blades, stator blades positioned upstream of the rotor blades, the stator blades defining nozzles having nozzle throats; primary inlet means for admitting exhaust gas into the turbine upstream of the stator blades; and wastegate inlet means for conducting the exhaust gas into a turbine region defined between the nozzle throats and the rotor blades, at least some of the stator blades having internal passages for receiving wastegate exhaust gas, the passages being arranged to discharge the wastegate exhaust gas through convex sides of the stator blades and direct the wastegate exhaust gas into the turbine region.

9. The turbocharger according to claim 8, in which at least one hole is formed through the convex side of each stator blade into its internal passage, said at least one hole being positioned to direct the wastegate exhaust gas into the turbine region.

10. A method of preventing a turbine of a turbocharger from choking at high speed, comprising the steps of: diverting a proportion of exhaust gas produced by an associated internal combustion engine into a region of the turbine which is downstream of turbine nozzle throats in a first stage of turbine stator blades; and increasing the proportion of diverted exhaust gas as a function of turbine speed.

11. The method according to claim 10, wherein the region of the turbine to which the proportion of the exhaust gas is diverted is defined between stator blade nozzle throats and downstream leading edges of rotor blades, the method including the step of introducing the diverted exhaust gas through convex surfaces of the stator blades.

* * * * *